UNITED STATES PATENT OFFICE.

HANS BUCHERER, OF BIEBRICH, GERMANY, ASSIGNOR TO THE FIRM OF KALLE & COMPANY, AKTIENGESELLSCHAFT, OF BIEBRICH, GERMANY.

MANUFACTURE OF AZO COLORING-MATTER.

1,026,902.  Specification of Letters Patent.   Patented May 21, 1912.

No Drawing. Original application filed May 4, 1910, Serial No. 559,399. Divided and this application filed July 7, 1911. Serial No. 637,268.

*To all whom it may concern:*

Be it known that I, HANS BUCHERER, a citizen of the German Empire, and resident of Biebrich-on-the-Rhine, Germany, have invented certain new and useful Improvements in the Manufacture of Azo Coloring-Matters, of which the following is a specification.

In the specification of application for Letters Patent Serial No. 559399 filed May 4th, 1910, of which application the present case is a division, I have described a process for producing a new amino-oxy-naphthalene sulfonic acid by subjecting the 2-amino-naphthalene-1.5-disulfonic acid to alkaline fusion. The new acid probably represents the 2-amino-5-oxy-naphthalene-1-sulfonic acid. Now I have found that, by combining this new acid with diazo compounds, coloring matters are obtained which are distinguished by the striking brilliancy of their shades beyond that obtainable with derivatives of the 1.5-naphthol-sulfonic acid.

The 2.5.1-amino-oxynaphthalene sulfonic acid forms two series of coloring matters according to whether its coupling is effected in acid, or alkali. In the first case, there are apparently produced coloring matters of 2.5-amino-naphthol the sulfonic group in position 1 being split off. In the alkaline coupling a coloring matter is formed in which the sulfonic group is retained and from the properties of the coloring matters obtained, it is to be concluded that the azo group enters into the ortho position to the hydroxyl group, that is in position 6.

The process may be illustrated by the following examples: 9.3 kilograms of anilin are diazotized in the usual manner and run while stirring into an alkaline solution of 23.9 kilograms of the 2-amino-5-oxynaphthalene-1-sulfonic acid. The formation of coloring matter takes place rapidly and smoothly, and a yellow-red coloring matter is obtained which can be salted out by the addition of common salt. If, in this example the 9.3 kilograms of anilin be replaced by 9.2 kilograms of benzidin, then on tetrazotizing and coupling, a red-violet coloring matter which is difficultly soluble in water is obtained, which dyes unmordanted cotton red-violet shades and which, on being diazotized on the fiber, and coupled with beta-naphthol becomes blue with a tinge of red. If the anilin be replaced by the equivalent amount of amino-azo-benzene-mono-sulfonic acid, a red coloring matter with a tinge of blue is obtained which dyes both cotton and wool red shades with a tinge of blue and which, in aqueous solution, turns a clear blue violet when sodium carbonate is added. In an analogous manner the acid can be compounded with other diazo compounds from amino-azo bodies to form secondary disazo coloring matters and the like. Further investigations have now shown that the acyl derivatives of the new acid possess also the same remarkable property of giving, on being coupled with diazo compounds, coloring matters distinguished by the striking brilliancy of their shade. As acyl compounds may be mentioned: the urea derivative and the acetyl and benzoyl derivative of the amino-oxy-naphthalene-sulfonic acid. The urea derivative is produced by the action of phosgen on an alkaline solution of the new acid. It differs from the corresponding urea derivative of the 2.5.7-amino-oxy-naphthalene sulfonic acid by its marked activity of reaction toward nitrous acid in mineral acid solution (the splitting off of the urea being thereby effected and the corresponding diazo compound obtained), while the urea derivative of the 2.5.7-amino-oxy-naphthalene sulfonic acid, as stated in the specification of German Letters Patent No. 116200 is unaffected by nitrous acid, so that, on adding small amounts of nitrite to the mineral acid solution, a powerful potassium-iodid starch reaction takes place. The coloring matters of the urea derivative of the new acid differ from the coloring matters which are produced by the coupling of the acid itself in having throughout a shade with a deeper tinge of blue. The same applies to the coloring matters of the acetyl and benzoyl derivative of the new amino-oxy-naphthalene sulfonic acid. The former is obtained by the action of acetic anhydrid, and the latter in the usual manner by the action of benzoyl chlorid on the alkaline solution of the new acid. The coupling is accomplished in the known manner. The coloring matter from para-toluidin and benzoyl-amino-oxy-naphthalene sulfonic acid dyes cotton pure scarlet-red shades.

With xylidin and cumidin coloring matters are obtained which, as was to be anticipated, have an increased tinge of blue; a similar effect as regards shade is obtained with beta- and, preferably, alpha-naphthylamin.

From the benzoyl-amino-oxy-naphthalene sulfonic acid, there are obtained according to the nature of the acid, by coupling with simple diazo compounds, only mono-azo coloring matters whereas the urea derivative gives mono- and dis-azo coloring matters, of which the latter are the most valuable on account of their marked affinity for cotton.

Not only can the dyestuffs above described and obtained by coupling the 2-amino-5-oxynaphthalene-1-sulfonic acid with diazo components be diazotized and developed either on or off the fibers, but also the 2-amino-5-oxynaphthalene-1-sulfonic acid can itself be diazotized and combined with suitable azo-dyestuff components.

In the claims the term "a 2-amino-5-oxynaphthalene-1-sulfonic acid" is used as generic to both the simple and the substituted amino acids.

What I claim is:

1. The manufacture of azo coloring matters which comprises diazotizing an amino compound and coupling it with a 2-amino-5-oxynaphthalene-1-sulfonic acid.

2. The manufacture of azo coloring matters which comprises diazotizing an amino compound and coupling it with a substituted 2-amino-5-oxynaphthalene-1-sulfonic acid.

3. The manufacture of azo coloring matters which comprises diazotizing an amino compound and coupling it with an acyl substituted 2-amino-5-oxynaphthalene-1-sulfonic acid, substituted in the amino group.

4. The manufacture of azo coloring matters which comprises diazotizing an amino compound and coupling it with a benzoyl substituted 2-amino-5-oxynaphthalene-1-sulfonic acid, substituted in the amino group.

5. As new products the azo coloring matters obtainable from a 2-amino-5-oxynaphthalene-1-sulfonic acid, and which yield upon reduction an amino compound and an amino derivative of 5-oxynaphthalene-1-sulfonic acid containing an amino group substituted in 2-position on the naphthalene ring, substantially as described.

6. As new products the azo coloring matters obtainable from a 2-amino-5-oxynaphthalene-1-sulfonic acid and diazotized amins and which yield upon reduction an amin and a 2-6-diamino-5-oxynaphthalene-1-sulfonic acid, substantially as described.

7. As new products the azo coloring matters, obtainable from an acyl substituted 2-amino-5-oxynaphthalene-1-sulfonic acid and diazotized amins, and which yield upon reduction an amin and an acyl-2-6-diamino-5-oxynaphthalene-1-sulfonic acid, substantially as described.

8. As new products the azo coloring matters, obtainable from a benzoyl substituted 2-amino-5-oxynaphthalene-1-sulfonic acid and diazotized amins, and which yield upon reduction an amin and a benzoyl-2-6-diamino-5-oxynaphthalene-1-sulfonic acid, substantially as described.

9. As a new product the azo coloring matter, obtainable from diazotized cumidin and the benzoyl-derivative of the 2-amino-5-oxynaphthalene-1-sulfonic acid, constituting in dry state a brownish-red powder, soluble in hot water with a red color and giving a solution which in a hot condition is not precipitated by diluted acetic acid, whereas by the addition of diluted hydrochloric or sulfuric acid the dyestuff is separated in form of brownish flakes soluble in concentrated sulfuric acid with a violet-red color from which solution brownish-red flakes are separated by the addition of water; being decomposed by zinc dust in neutral solution into cumidin and benzoyl-diamino-oxynaphthalene sulfonic acid; which latter turns blue by the oxidizing action of the air in the presence of alkali and furnishes a greenish blue precipitate by the addition of ferro-chlorid; and dyeing vegetable fibers beautiful scarlet red shades.

In testimony whereof I have signed my name to this specification in the presence of two subscribing witnesses.

HANS BUCHERER.

Witnesses:
MARIA MENKE,
HERMAN PLISCHER.